United States Patent
Czajkowski

(10) Patent No.: US 6,567,974 B1
(45) Date of Patent: May 20, 2003

(54) SMALL MEMORY FOOTPRINT SYSTEM AND METHOD FOR SEPARATING APPLICATIONS WITHIN A SINGLE VIRTUAL MACHINE

(75) Inventor: Grzegorz J. Czajkowski, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/513,291

(22) Filed: Feb. 25, 2000

(51) Int. Cl.$^7$ .............................. G06F 9/45; G06F 9/44
(52) U.S. Cl. ...................... 717/151; 717/127; 717/118; 717/161
(58) Field of Search ................... 717/151–158, 717/159–161, 121, 118

(56) References Cited

U.S. PATENT DOCUMENTS

| | | | | | |
|---|---|---|---|---|---|
| 5,924,098 | A | * | 7/1999 | Kluge | 707/100 |
| 5,946,487 | A | * | 8/1999 | Dangelo | 717/148 |
| 6,066,181 | A | * | 5/2000 | DeMaster | 717/148 |
| 6,108,754 | A | * | 8/2000 | Lindholm | 711/122 |
| 6,138,238 | A | * | 10/2000 | Scheifler et al. | 713/200 |
| 6,141,794 | A | * | 10/2000 | Dice et al. | 717/118 |
| 6,321,298 | B1 | * | 11/2001 | Hubis | 711/124 |
| 6,345,313 | B1 | * | 2/2002 | Lindholm | 709/315 |
| 6,374,286 | B1 | * | 4/2002 | Gee et al. | 709/108 |
| 6,453,460 | B1 | * | 9/2002 | Keyes | 717/108 |

OTHER PUBLICATIONS

Bogda et al. Removing Unnecessary Synchronization in Java. ACM. 1999. pp. 35–46.*
Dinning. A Survey of Synchronization Methods for Parallel Computers. IEEE. 1989. pp. 66–77.*
Gardner et al. Performance of Algorithms for Sheduling Real–Time Systems with Overrun and Overload. IEEE. 1999. pp. 287–296.*
Schneider. Cache and Pipeline Sensitive Fixed Priority Scheduling for Preemptive Real–Time Systems. IEEE. 2000. pp. 195–204.*

Co–pending application Ser. No. 10/123,702, filed Apr. 16, 2002.

Co–pending application Ser. No. 09/513,292, filed Feb. 25, 2002.

* cited by examiner

*Primary Examiner*—Gregory Morse
*Assistant Examiner*—Wei Zhen
(74) *Attorney, Agent, or Firm*—Meyertons Hood Kivlin Kowert & Goetzel, P.C.; B. Noël Kivlin

(57) ABSTRACT

A system and method for isolating the execution of a plurality of applications. The applications may utilize or share one or more "original" classes. Only one copy of each original class is maintained, regardless of how many applications utilize it. Static fields are extracted from the original classes. A separate copy of the static fields is created for each of the utilizing applications. A static field class which includes instance fields corresponding to the static fields may be created, wherein each instance of the static field class corresponds to one of the utilizing applications. Access methods for the one or more static fields may be created, wherein the access methods are operable to access the corresponding separate copy of the static fields based upon the identity of the utilizing application. A single access methods class may be created for each original class, wherein the single access methods class includes the access methods for accessing the extracted fields from the original class. The method and system may be optimized by exempting from extraction static fields that are classified as secure for utilization by the plurality of applications without inter-application interference. The secure set of static fields may include final static fields of primitive types, final static strings, immutable arrays of primitive types, and/or other appropriate fields.

30 Claims, 11 Drawing Sheets

SMALL MEMORY FOOTPRINT SYSTEM AND METHOD FOR SEPARATING APPLICATIONS WITHIN A SINGLE VIRTUAL MACHINE

BACKGROUND OF THE INVENTION

1. Field of the Invention

The present invention relates generally to computer software. More particularly, the present invention relates to the efficient isolation of applications executing concurrently in a multi-processing environment.

2. Description of the Relevant Art

The growing popularity of the platform-independent programming language Java™ has brought about an increased need for executing multiple Java™ applications co-located on the same computer. Ideally, such applications should be protected from one another. In other words, an application should not be able to corrupt the data of another, and the application should not be able to prevent another application from performing its activities. At the same time, marginal systems resources needed to start new Java™ applications should be as small as possible so that the number of concurrently executing applications can be as high as possible.

One approach to Java™ multiprocessing is to rely on the operating system (OS) for protection. Typically, this means running multiple copies of the Java™ Virtual Machine (JVM), one per application, starting each application in a separate copy of the JVM, which effectively is spawning a new operating system process for each application. This provides a strong process-level separation in that applications are totally isolated from one another (although they can communicate, for instance, via sockets, RMI, etc), but uses large amounts of resources in terms of virtual memory and startup time, and makes inter-application communication expensive. In addition, this approach tends to scale poorly.

A project at the University of Utah resulted in two variants of Java™ operating systems which demonstrate how a process model can be implemented in Java™ and how an underlying OS protection can be exploited for Java™ multiprocessing. See Back, G., Tullmann, P., Stoller, L., Hsieh, W., and Lepreau, J., *Java Operating Systems: Design and Implementation,* Technical Report UUCS-98-015, Department of Computer Science, University of Utah, August 1998. The first system, GVM, is structured much like a monolithic kernel and focuses on complete resource isolation between processes and on comprehensive control over resources. A GVM process comprises a class loader-based name space, a heap, and a set of threads in that heap. In addition to their own heaps, all processes have access to a special, shared system heap. For every heap, GVM tracks all references leading to other heaps and all references pointing into it. This information is used to implement a form of distributed garbage collection. The CPU management in GVM combines CPU inheritance scheduling with the hierarchy introduced by Java™ thread groups: thread groups within processes may hierarchically schedule the threads belonging to them.

A second variant of a Java™ operating system developed at the University of Utah, Alta, closely models a microkernel model with nested processes, in which a parent process can manage all resources available to child processes. Memory management is supported explicitly, through a simple allocator-pays scheme. The garbage collector credits the owning process when an object is eventually reclaimed. Because Alta allows cross-process references, any existing objects are logically added into the parent memory. This makes the parent process responsible for making sure that cross-process references are not created if full memory reclamation is necessary upon process termination. Both GVM and Alta are implemented as considerable modifications to the JVM. Both systems support strong process models: each can limit the resource consumption of processes, but still permit processes to share data directly when necessary.

Advocates of process-based Java™ application separation point out that a failure of one process terminates only this particular application and may potentially affect other applications only through an absence of service. Common wisdom states that processes are more reliable than implementations of JVMs. This reasoning implies that executing multiple applications in a single copy of the JVM puts them at a risk of being abruptly terminated because another application triggers an action, which will cause the whole JVM to go down. However, it does not necessarily have to be so. Processes still execute on top of an underlying operating system, and no major operating system kernel is guaranteed to be bug-free. Ultimately, one trusts software, whether it is an OS or a runtime of a safe language. The reliability issues of the Java™ platform and of an OS kernel are essentially the same. Moreover, safe language has less potential for crashing because of software problems.

The SPIN extensible operating system, written almost entirely in a safe subset of Modula-3, utilizes both hardware and software protection. See Bershad, B., Savage, S., Pardyak, P., Sirer, E., Fiuczynski, M., Becker, D., Eggers, S., and Chambers, C., *Extensibility, Safety and Performance in the SPIN Operating System,* $15^{th}$ ACM Symposium on Operating Systems Principles, Copper Mountain, Colo., December 1995. Hardware protection is used to isolate address spaces; software protection protects the OS kernel from extensions. However, it is the view of the SPIN authors that protection is a software issue, and that with a well-designed inter-application isolation in a safe language, there should be no need for hardware protection. See Bershad, B., Savage, S., Pardyak, P., Becker, D., Fiuczynski, M., Sirer, E., *Protection is a Software Issue,* $5^{th}$ Workshop on Hot Topics in Operating Systems, Orcas Island, Wash., May 1995.

An alternative approach is to execute applications in the same instance of the JVM. Typically, each application is loaded by a separate class loader. See Liang S., and Bracha, G., *Dynamic Class Loading in the Java Virtual Machine,* In Proceedings of ACM OOPSLA'98, Vancouver, BC, Canada, October 1998. This code replication is especially wasteful in the presence of just-in-time compilers (JITs). Currently available class loading mechanisms separately compile and separately store the JITed code of each loaded class, regardless of whether the class has already been loaded by another application or not. This can easily lead to significant memory footprints, since, on the average, a byte of bytecode may translate into about five bytes of native code, where the term bytecode refers to compiled. Java™ code. See Cramer, T., Friedman, R., Miller, T., Seberger, D., Wilson, R., and Wolczko, M., *Compiling Java Just in Time,* IEEE Micro, May/June 1997. Combined with the safety of the language, this approach leads to systems where applications are mostly isolated from one another. The place where the isolation breaks is the interaction of applications through static fields and static synchronized methods of system classes (as they are not subject to per-application replication).

A simple example of a Java™ multiprocessing utilizing class loaders is the class library Echidna. With a reasonable degree of transparency, it allows multiple applications to run inside a single JVM. Applications can cleanly dispose of important resources when they are killed. For example, when a process is killed all its windows are automatically removed.

A more complex example of a class loader based approach to application protection is the J-Kernel. See Hawblitzel, C., Chang, C-C., Czajkowski, G., Hu, D. and von Eicken, T., Implementing Multiple Protection Domains in Java, In Proceedings of USENIX Annual Conference, New Orleans, La., June 1998. The J-Kernel adds protection domains to Java and makes a strong distinction between objects that can be shared between tasks and objects that are confined to a single task. Each domain has its own class loader. The system, written as a portable Java™ library, provides mechanisms for clean domain termination (e.g., no memory allocated by the task is "left over" after it is terminated) and inter-application communication (performed via deep object copies or methods arguments and return values).

Balfanz and Gong designed a multiprocessing JVM in order to explore the use of the Java™ security architecture to protect applications from each other. See Balfanz, D., and Gong, L., *Experience with Secure Multi-Processing in Java*, Technical Report 560–97, Department of Computer Science, Princeton University, September, 1997. The proposed extensions enhance the standard JVM so that it can support multiprocessing. An important part of the work is clear identification of several areas of the JDK that assume a single-application model.

Two current trends cast doubt on the future usefulness of these two approaches to Java™ multiprocessing. On one end of the computing power spectrum, high-end high throughput servers have to deal with large volumes of concurrently executing Java™ programs. Increasingly, in addition to traditional, large and self-contained applications, smaller entities (e.g., applets, servlets, and JavaBeans™ components) are part of the computation system. The OS-based approach to Java™ multiprocessing is often unacceptable in these settings since it requires allocating large amounts of system resources for starting many copies of the JVM and thus tends to scale very poorly. Using class loaders has the potential for better scaling performance but it also wastes resources on replicating application code when more than one application executes the same program. Indicated isolation inconsistencies make this approach unsafe in general.

On the other end of the spectrum, small-footprint JVMs are emerging which target small devices. They typically lack many features available in fully blown implementations of the JVM available on general-purpose computers. An example is the K Virtual Machine (KVM) from Sun Microsystems, Inc. Since the KVM specification does not require that its implementations provide class loaders, multiprocessing in a single instance of the KVM is possible only when all applications are trusted and guaranteed not to interfere with one another. Process-based multiprocessing using KVM is also problematic since small devices for which it is meant do not necessarily provide a process model with adequate strong application separation guarantees. Another example of a Java™-based system without an underlying OS process abstraction is JavaOS™.

As stated above, systems offering Java™ multiprocessing can be classified as either based on an underlying operating system, which typically means running one process for each Java™ application, or as using class loaders. However, using operating system processes is expensive, scales poorly, and does not fully exploit the protection features inherent in a safe language. Class loaders replicate application code, obscure the type system, and non-uniformly treat "trusted" and "untrusted" classes, which leads to subtle but nevertheless potentially harmful forms of undesirable inter-application interaction.

One way to achieve multi-tasking in a single processing space is through the use of threads. Multithreaded applications may be written in languages such as C and C++, but writing multithreaded C and C++ applications may be difficult. Furthermore, there are no assurances that third-party libraries are thread-safe. As used herein, "thread-safe" means that a given library function is implemented in such a manner that it can be safely executed by multiple concurrent threads of execution. Thread-safe programming often relies on "locks" or "monitors," which are used synonymously herein. One major problem with explicitly programmed thread support is that acquiring and releasing the locks needed at the right time tends to be difficult. For example, if a method returns prematurely, or if an exception is raised, and a related lock has not been released, deadlock usually results.

The Java™ Language provides some built-in support for threads. The Java™ library provides a Thread class that supports a rich collection of methods to start a thread, run a thread, stop a thread, and check on a thread's status. This built-in support for threads provides Java™ programmers with a powerful tool to improve interactive performance of graphical applications. If an application desires to run animations and play music while scrolling the page and downloading a text file from a server, for example, then multithreading provides fast, lightweight concurrency within a single process space. Threads are sometimes referred to as lightweight processes or execution contexts.

Java™ thread support includes a sophisticated set of synchronization primitives based on the widely used monitor and condition variable paradigm introduced twenty years ago by C. A. R. Hoare and implemented in a production setting in Xerox PARC's Cedar/Mesa system. Java™ supports multithreading at the language (syntactic) level and via support from its run-time system and thread objects. At the language level, Java™ specifies that methods within a class that are declared "synchronized" do not run concurrently. Such methods run under control of monitors to ensure that variables remain in a consistent state. Every class and instantiated object has its own monitor that comes into play if required. When a synchronized method is entered, it acquires a monitor on the current object. The monitor precludes any other synchronized methods in that object from running. When a synchronized method returns by any means, its monitor is released. Other synchronized methods within the same object are then free to run.

While other systems have provided facilities for multithreading (usually via "lightweight process" libraries), building multithreading support into the language as Java™ has done provides the programmer with a much more powerful tool for easily creating thread-safe multithreaded classes. Other benefits of multithreading are better interactive responsiveness and real-time behavior.

Nonetheless, the built-in support for multithreading in the Java™ Language has its drawbacks. For example, applications may contend for the execution of a static synchronized method. A synchronized method acquires a monitor lock before it executes, and a static method is invoked without reference to a particular object. For a static synchronized method, the lock associated with the class object for the method's class is used. One application may acquire a lock on a static synchronized method and refuse to release the lock, thereby preventing other applications from invoking the method.

Therefore, an improved system and method for efficiently isolating applications within a single virtual machine are desired.

SUMMARY OF THE INVENTION

The problems outlined above are in large part solved by various embodiments of a system and method for isolating the execution of a plurality of applications as disclosed herein. The applications may include applets, servlets, operating system services, components, JavaBeans™, or other suitable executable units or programs. "Application" and "program" are herein used synonymously. In one embodiment, the applications are executable in a platform-independent programming environment such as the Java™ environment. In one embodiment, the applications are executable on a single instance of a virtual machine, such as a Java™ Virtual Machine, which is implemented in accordance with a platform-independent virtual machine specification, such as the Java™ Virtual Machine Specification. The plurality of applications may utilize one or more "original" classes. In other words, the original classes may be shared by a plurality of applications. The general approach taken by the system and method as disclosed herein is to create new classes to replace the original classes in order to isolate the execution of the applications, such that different applications cannot typically access the same static fields. In one embodiment, only one copy of each original class is maintained, regardless of how many applications utilize it. Classes are transparently and automatically modified, so that each application has a separate copy of its static fields. This provides for a minimal collective footprint, with strong application isolation. In addition, this allows class loaders to be removed from the type system.

In one embodiment, one or more static fields are extracted from one or more original classes utilized by any of the plurality of applications, wherein each of the one or more original classes includes at least one static field. In one embodiment, a separate copy of the one or more static fields is created for each of the plurality of applications, wherein each of the separate copies corresponds to one of the plurality of applications. Creating the separate copy of the one or more static fields may include creating a static field class which includes instance fields corresponding to the one or more static fields, wherein each instance of the static field class corresponds to one of the plurality of applications. In one embodiment, one or more access methods for the one or more static fields may be created. The access methods are operable to access the corresponding separate copy of the one or more static fields based upon the identity of the utilizing or calling application. Creating access methods for the one or more static fields may include creating a single access methods class for each original class which includes the access methods for accessing the extracted fields from the original class.

In one embodiment, the method for isolating the execution of the applications is transparent to the utilizing applications. In various embodiments, the extraction of the static fields, creation of the separate copies of the static fields, and creation of the access methods may be performed at run-time or at compilation, and at the source level or the bytecode level. In a further embodiment, the method may be performed upon structures rather than classes, such as in a programming environment that is not object-oriented.

Further optimizations to the method for isolating the execution of the applications may be performed. A set of static fields may be classified as secure for utilization by the plurality of applications without inter-application interference. The secure set of static fields may include final static fields of primitive types, final static strings, immutable arrays of primitive types, and/or other appropriate fields. The secure set of static fields may then be preserved within the one or more classes. In other words, the set of static fields may be exempted from the one or more static fields which are extracted from the one or more classes.

BRIEF DESCRIPTION OF THE DRAWINGS

Other objects and advantages of the invention will become apparent upon reading the following detailed description and upon reference to the accompanying drawings in which.

Figure 1:
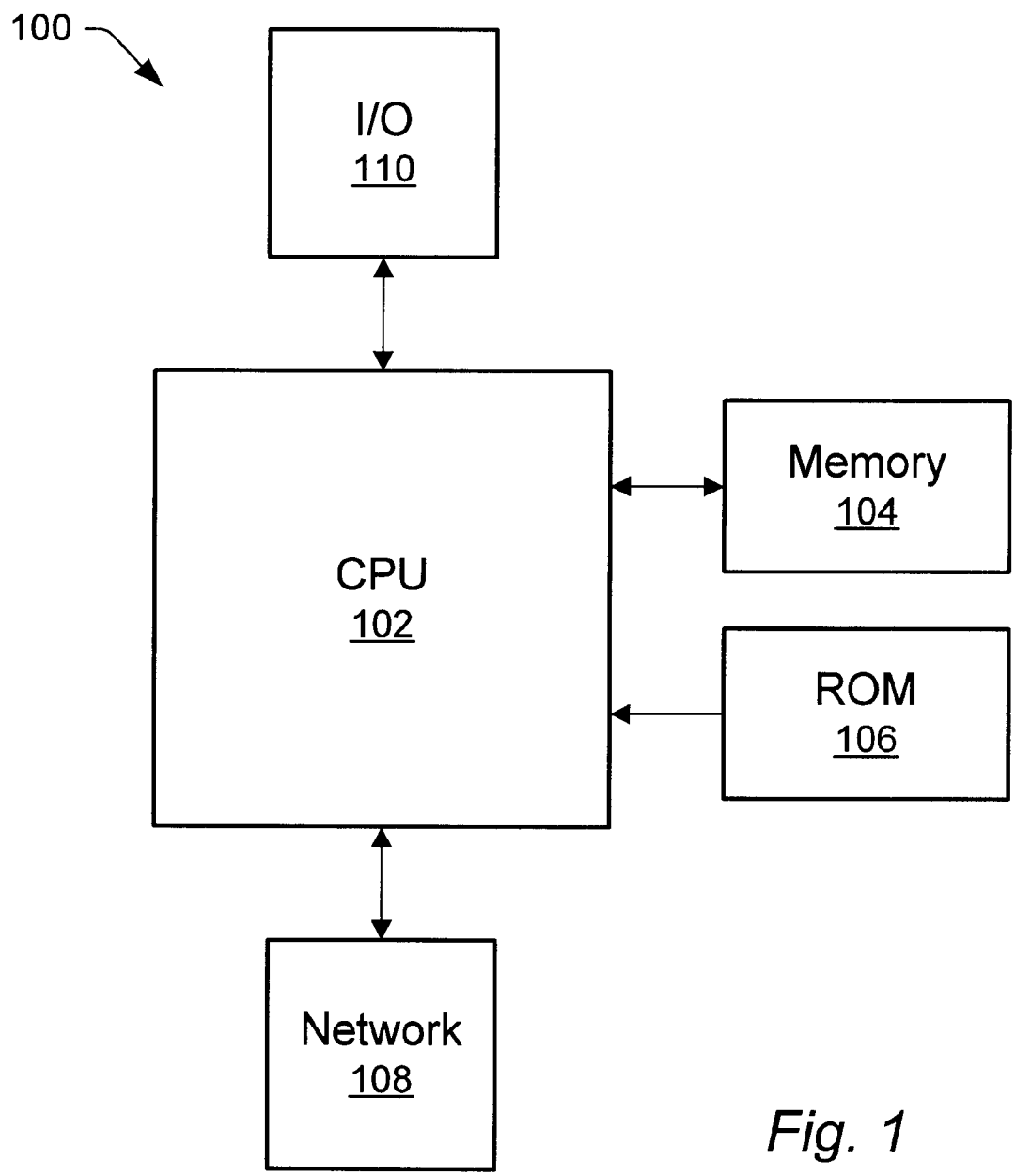
FIG. 1 is an illustration of a typical computer system architecture which is suitable for implementing various embodiments.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1: A Typical Computer System

Turning now to the drawings, FIG. 1 is an illustration of a typical, general-purpose computer system 100 which is suitable for implementing the system and method for application isolation as disclosed herein. As discussed with reference to FIGS. 6 through 8, the system and method for application isolation may include providing multiple copies of static fields to isolate the execution of the applications, such that different applications cannot typically access the same static field.

The computer system 100 includes at least one central processing unit (CPU) or processor 102. The CPU 102 is coupled to a memory 104 and a read-only memory (ROM) 106. The memory 104 is representative of various types of possible memory media: for example, hard disk storage, floppy disk storage, removable disk storage, or random access memory (RAM). The terms "memory" and "memory medium" may include an installation medium, e.g., a CD-ROM or floppy disk, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1, typically the memory 104 permits two-way access: it is readable and writable. The ROM 106, on the other hand, is readable but not writable. The memory 104 and/or ROM 106 may store instructions and/or data which implement all or part of the system and method described in detail herein, and the memory 104 and/or ROM 106 may be utilized to install the instructions and/or data. In various embodiments, the computer system 100 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" can be broadly defined to encompass any device having a processor which executes instructions from a memory medium.

The CPU 102 may be coupled to a network 108. The network 108 is representative of various types of possible networks: for example, a local area network (LAN), wide area network (WAN), or the Internet. The system and method for application isolation in accordance as disclosed herein may therefore be implemented on a plurality of heterogeneous or homogeneous networked computer systems 100 through one or more networks 108. The CPU 102 may acquire instructions and/or data for implementing system and method for application isolation in accordance as disclosed herein over the network 108.

Through an input/output bus 110, the CPU 102 may also coupled to one or more input/output devices that may include, but are not limited to, video monitors or other displays, track balls, mice, keyboards, microphones, touch-sensitive displays, magnetic or paper tape readers, tablets, styluses, voice recognizers, handwriting recognizers, printers, plotters, scanners, and any other devices for input and/or output. The CPU 102 may acquire instructions and/or data for implementing the system and method for application isolation as disclosed herein through the input/output bus 110.

The computer system 100 is operable to execute one or more computer programs. The computer programs may comprise operating system or other system software, application software, utility software, Java™ applets, and/or any other sequence of instructions. Typically, an operating system performs basic tasks such as recognizing input from the keyboard, sending output to the display screen, keeping track of files and directories on the disk, and controlling peripheral devices such as disk drives and printers. Application software runs on top of the operating system and provides additional functionality. Because applications take advantage of services offered by operating systems, and because operating systems differ in the services they offer and in the way they offer the services, an application must usually be designed to run on a particular operating system. The computer programs are stored in a memory medium or storage medium such as the memory 104 and/or ROM 106, or they may be provided to the CPU 102 through the network 108 or I/O bus 110.

In one embodiment, the computer programs executable by the computer system 100 may be implemented in the Java™ Language. The Java™ Language is described in *The Java Language Specification* by Gosling, Joy, and Steele (Addison-Wesley, ISBN 0-201-63451-1), which is incorporated herein by reference. A general discussion of the Java™ Language follows. The Java™ Language is an object-oriented programming language. In an object-oriented programming language, data and related methods can be grouped together or encapsulated to form an entity known as an object. All objects in an object-oriented programming system belong to a class, which can be thought of as a category of like objects which describes the characteristics of those objects. Each object is created as an instance of the class by a program. The objects may therefore be said to have been instantiated from the class. The class sets out variables and methods for objects which belong to that class. The definition of the class does not itself create any objects. The class may define initial values for its variables, and it normally defines the methods associated with the class (i.e., includes the program code which is executed when a method is invoked.) The class may thereby provide all of the program code which will be used by objects in the class, hence maximizing re-use of code which is shared by objects in the class.

Figure 2:
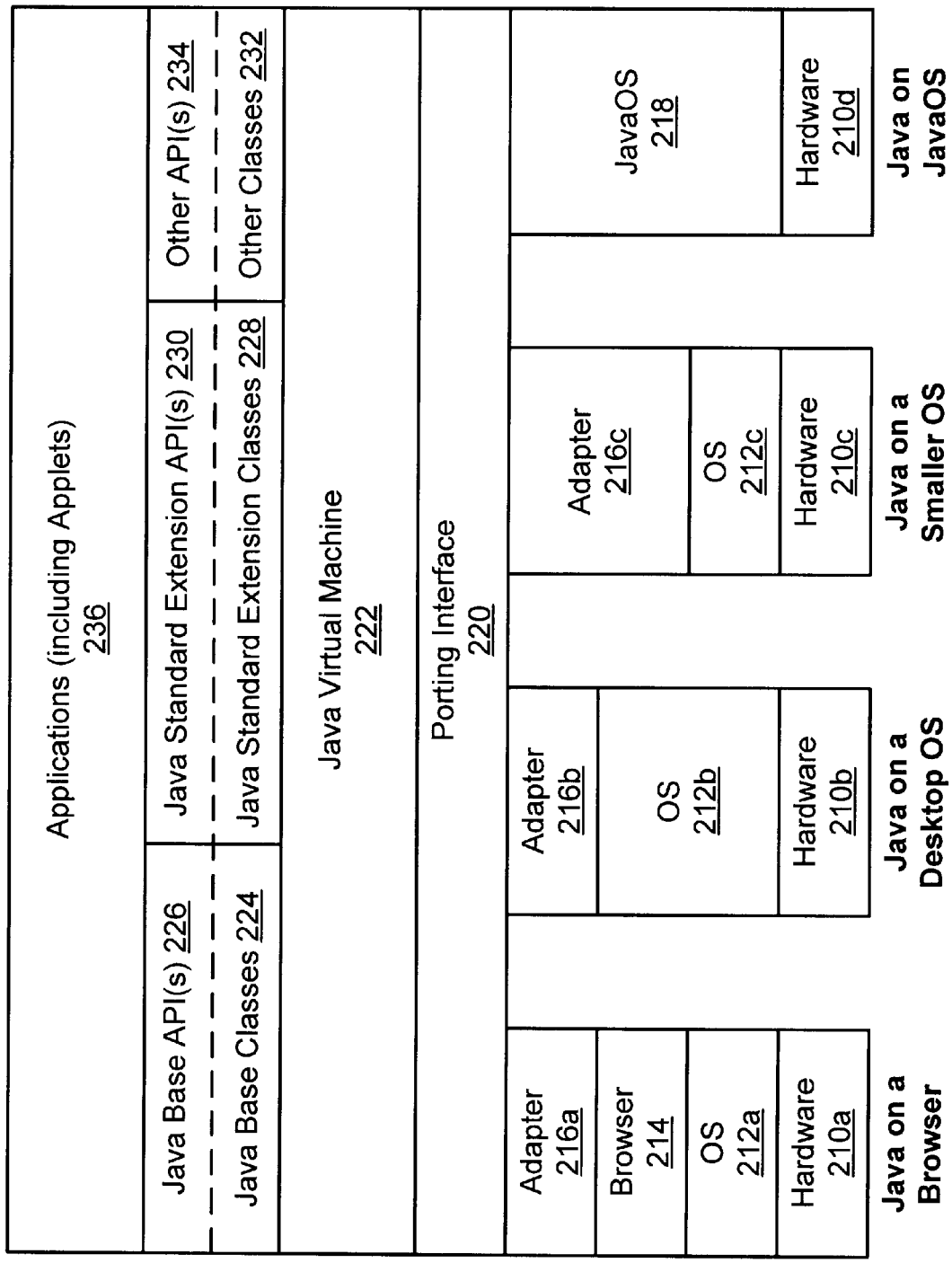
FIG. 2 is an illustration of a Java™ Platform architecture which is suitable for implementing various embodiments.

FIG. 2: The Java™ Platform

The Java™ Platform which utilizes the object-oriented Java™ Language is a software platform for delivering and running the same applications on a plurality of different operating systems and hardware platforms. As will be described in further detail below, the Java™ Platform includes system-dependent portions and system-independent portions, and therefore the Java™ Platform may be thought of as having multiple embodiments. The Java™ Platform sits on top of these other platforms, in a layer of software above the operating system and above the hardware. FIG. 2 is an illustration of the Java™ Platform and the relationships between the elements thereof in one embodiment. The Java™ Platform has two basic parts: the Java™ Virtual Machine 222, and the Java™ Application Programming Interface (Java™ API). The Java™ API may be thought of as comprising multiple application programing interfaces (APIs). While each underlying platform has its own implementation of the Java™ Virtual Machine 222, there is only one Virtual Machine specification. The Java™ Virtual Machine specification is described in *The Java Virtual Machine Specification* by Lindholm and Yellin (Addison-Wesley, ISBN 0-201-63452-X), which is incorporated herein by reference. By allowing the Java™ applications 236 to execute on the same Virtual Machine 222 across many different underlying computing platforms, the Java™ Platform can provide a standard, uniform programming interface which allows Java™ applications 236 to run on any hardware on which the Java™ Platform has been implemented. The Java™ Platform is therefore designed to provide a "write once, run anywhere" capability.

Developers may use the Java™ Language and Java™ APIs to write source code for Java™-powered applications 236. A developer compiles the source code only once to the Java™ Platform, rather than to the machine language of an underlying system. Java™ programs compile to bytecodes which are machine instructions for the Java™ Virtual Machine 222. A program written in the Java™ Language compiles to a bytecode file which can run wherever the Java™ Platform is present, on any underlying operating system and on any hardware. In other words, the same Java™ application can run on any computing platform that is running the Java™ Platform. Essentially, therefore, Java™ applications 236 are expressed in one form of machine language and are translated by software in the Java™ Platform to another form of machine language which is executable on a particular underlying computer system.

The Java™ Virtual Machine 222 is implemented in accordance with a specification for a "soft" computer which can be implemented in software or hardware. As used herein, a "virtual machine" is generally a self-contained operating environment that behaves as if it were a separate computer. As shown in FIG. 2, in one embodiment, the Java™ Virtual Machine 222 is implemented in a software layer. Various implementations of the Java™ Virtual Machine 222 can run on a variety of different computing platforms: for example, on a browser 214 sitting on top of an operating system (OS) 212a on top of hardware 210a; on a desktop operating system 212b on top of hardware 210b; on a smaller operating system 212c on top of hardware 210c; or on the JavaOS operating system 218 on top of hardware 210d. Computer hardware 210a, 210b, 210c, and 210d may comprise different hardware platforms. JavaOS 218 is an operating system that is optimized to run on a variety of computing and consumer platforms. The JavaOS 218 operating environment provides a runtime specifically tuned to run applications written in the Java™ Language directly on computer hardware without requiring another operating system.

The Java™ API or APIs form a standard interface to Java™ applications 236, regardless of the underlying operating system or hardware. The Java™ API or APIs specify a set of programming interfaces between Java™ applications 236 and the Java™ Virtual Machine 222. The Java™ Base API 226 provides the basic language, utility, I/O, network, GUI, and applet services. The Java™ Base API 226 is typically present anywhere the Java™ Platform is present. The Java™ Base Classes 224 are the implementation of the Java™ Base API 226. The Java™ Standard Extension API 230 provides additional capabilities beyond the Java™ Base API 226. The Java™ Standard Extension Classes 228 are the implementation of the Java™ Standard Extension API 230. Other APIs in addition to the Java™ Base API 226 and Java™ Standard Extension API 230 can be provided by the application or underlying operating system. A particular Java™ environment may include additional APIs 234 and the classes 232 which implement them. Each API is organized by groups or sets. Each of the API sets can be implemented as one or more packages or namespaces. Each package groups together a set of classes and interfaces that define a set of related data, constructors, and methods, as is well known in the art of object-oriented programming.

The porting interface 220 lies below the Java™ Virtual Machine 222 and on top of the different operating systems 212b, 212c, and 218 and browser 214. The porting interface 220 is platform-independent. However, the associated adapters 216a, 216b, and 216c are platform-dependent. The porting interface 220 and adapters 216a, 216b, and 216c enable the Java™ Virtual Machine 222 to be easily ported to new computing platforms without being completely rewritten. The Java™ Virtual Machine 222, the porting interface 220, the adapters 216a, 216b, and 216c, the JavaOS 218, and other similar pieces of software on top of the operating systems 212a, 212b, and 212c may, individually or in combination, act as means for translating the machine language of Java™ applications 236, APIs 226 and 230, and Classes 224 and 228 into a different machine language which is directly executable on the underlying hardware.

Figure 3:
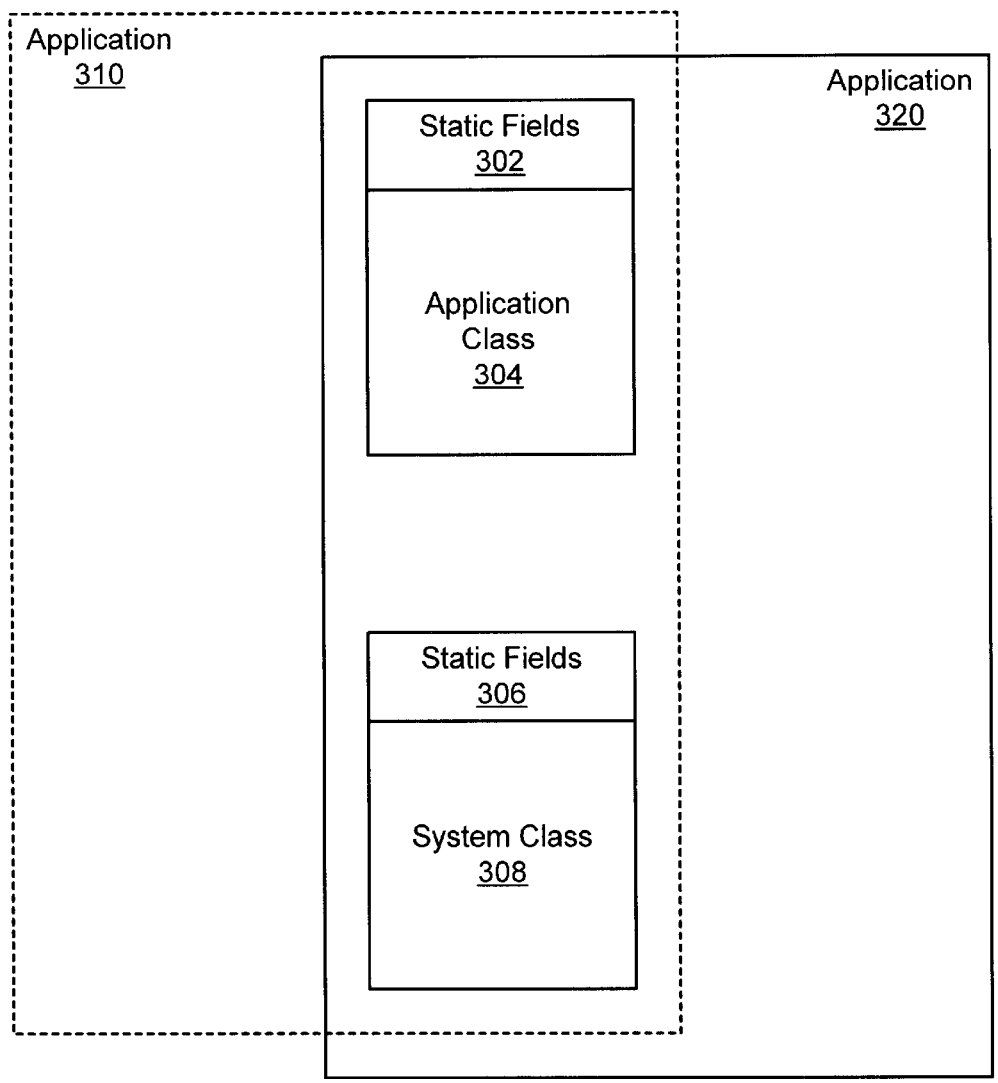
FIGS. 3 through 5 are illustrations of class sharing between two applications according to various embodiments.
Figure 4:
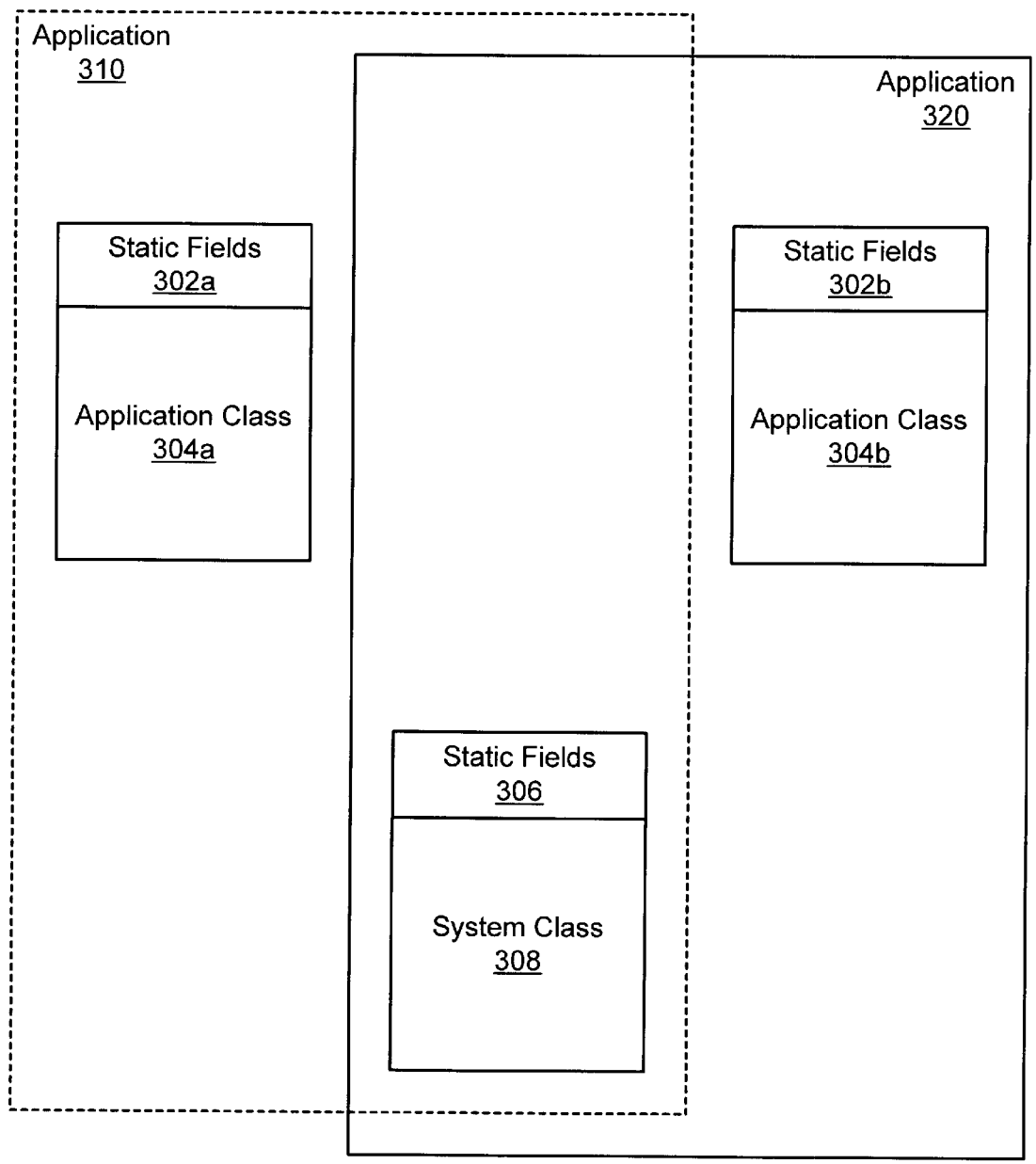
Figure 5:
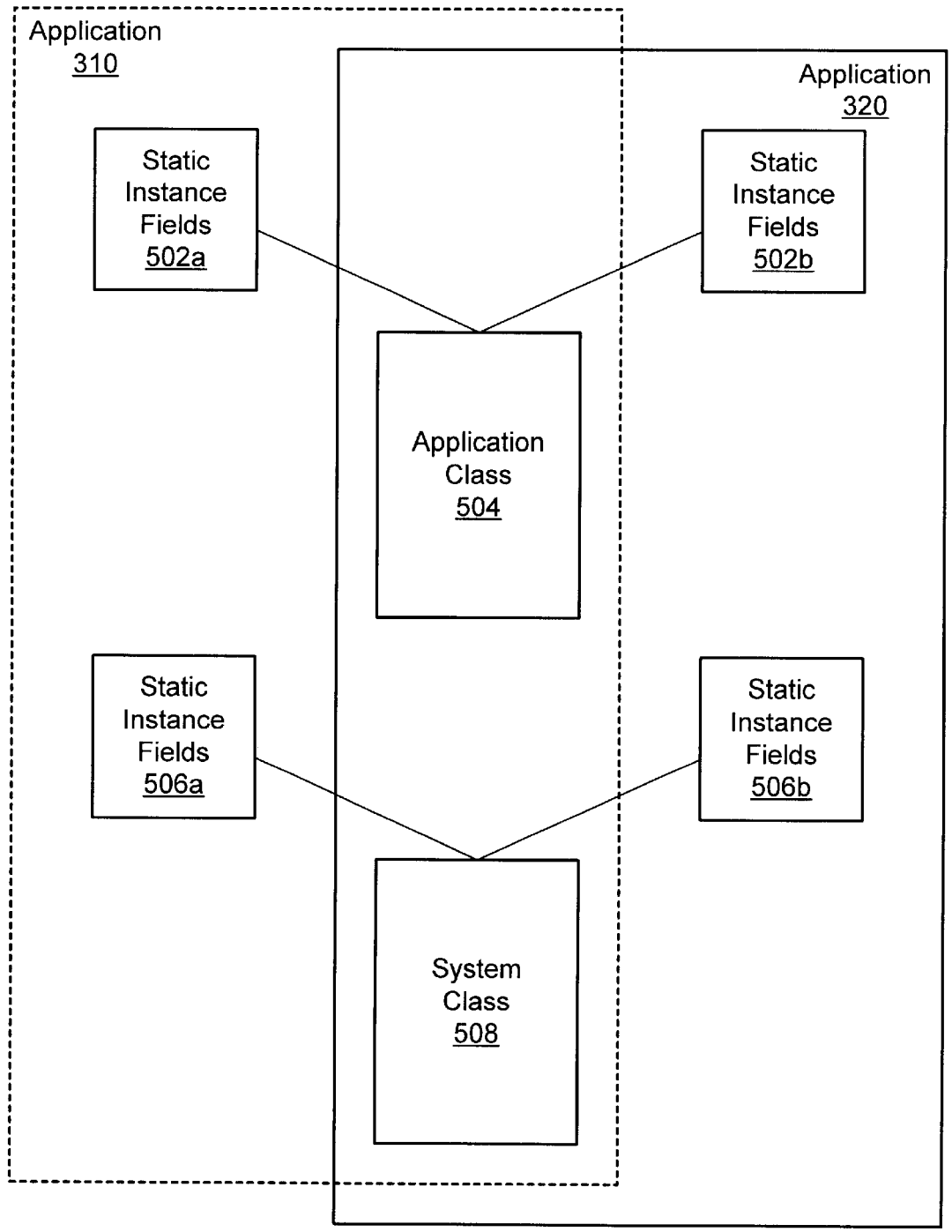

FIGS. 3, 4, and 5: Class Sharing Among Applications

FIGS. 3, 4, and 5 illustrate several approaches to class sharing among concurrently executing applications. In one embodiment, several recommendations and/or assumptions may be made about the class of the environments targeted with these approaches. First, each application is assumed to have an identifier which can be obtained from the current thread. In general, it is not important whether this identifier is an object or an integer. It is also recommended that the only inter-application communication mechanisms are via mechanisms which copy data. In other words, it is recommended that there is no mechanism for passing an object reference from one application to another. Third, the environments of interest should have a way to launch multiple applications. In an embodiment in which the applications are implemented in Java™, another recommendation may be made concerning the native code. In this embodiment, it is recommended that the only native methods present are the ones defined in core Java™ classes bundled with the JVM. Following this recommendation will tend to ensure that applications are isolated from interference at the native code level.

It is further recommended that thread termination and suspension requests are deferred whenever the thread executes non-reentrant native code and are effective immediately upon return. It is recommended that no part of native code should both be non-reentrant and blocking. Using monitors may enables such structuring of the native code. Without meeting this recommendation, the system and method for application isolation as described herein may still be used to isolate applications, but their clean termination may be difficult.

FIG. 3 illustrates class sharing in a typical Java™ multi-processing environment in which all applications share all classes. A first application 310 and a second application 320 are shown for purposes of illustration. Both applications 310 and 320 utilize application class 304 and system class 308. This approach relies on the fact that Java™ is a safe language and already includes some limited built-in support for isolating applications from one another. For example, data references cannot be forged. Consequently, the only data exchange mechanism, barring explicit Inter-Process Communications, is through static fields such as static fields 302 (associated with application class 304) and 306 (associated with system class 308). As used herein, a "static field" generally includes any data field or storage location which is shared by more than one application, process, thread, class, instance, structure, or other suitable domain. In the Java™ Language, for example, a class static field is a field which exists only once per class.

In the absence of application-defined native code (as recommended above), interapplication communication through static fields can be performed by explicit manipulation of static fields 302 and 306 or by invoking methods which access these fields. This use of static fields 302 and 306 can lead to unexpected and incorrect behavior depending on how many applications use the same class with static fields.

FIG. 4 illustrates a class sharing approach dependent on class-loader based protection. Each application 310 and 320 has a separate copy 304a and 304b of the application class (with respective static fields 302a and 302b), but all system classes such as system class 308 (with static fields 306) are shared. Two observations are important in this case. First, typically class loaders do not share enough: namely, there is no need to replicate the code of application classes 304a and 304b. Second, class loaders share too much: namely, they share static fields 306 of system classes 308. As above, the sharing of static fields 306 across applications may lead to unexpected behavior depending on how the sharing applications use the shared fields.

FIG. 5 illustrates an approach that addresses the shortcomings of the two methods described above with reference to FIGS. 3 and 4. As FIG. 5 shows, separation between applications 310 and 320 may be achieved by maintaining a separate copy of static fields for each class, with one such copy per application that uses a given class. For example, the first application 310 may have access to static instance fields 502a of an application class 504 and static instance fields 506a of a system class 508, and the second application 320 may have access to static instance fields 502b of the application class 504 and static instance fields 506b of the system class 508. However, only one copy of any class exists in the system, regardless of how many applications utilize it, since methods cannot transfer data from one application to another after the communication channel provided by the static fields is removed. Therefore, the system and method for application isolation as described herein effectively gives each application 310 and 320 an illusion that it has exclusive access to static fields, while in reality, each application 310 and 320 has a separate copy of these fields.

The approach shown in FIG. 5 combines the best features of the OS-based approach and the class-loader based approach. First, it permits a plurality of applications to execute in a single virtual machine. This capability has all the advantages of class loaders over processes in that switching from one application to another does not require a costly process context switch, startup time is faster, and fewer resources per application are necessary, which improves the overall system scalability. Second, only one copy of a class is loaded into the system, regardless of how many applications use it. This improves over both existing approaches (as discussed with reference to FIGS. 3 and 4) in terms of both saved code space and saved repeated compilation time. Third, applications are isolated from one another, i.e., they cannot exchange data through shared variables of any class, be it an application class or a system class, and they cannot block one another from calling synchronized methods. This is a separation level expected from an operating system approach and an improvement over what class loaders can offer. Finally, no new application-programming interface is introduced. In particular, existing applications' bytecode does not have to be modified in order to execute under the proposed isolation model.

Figure 6:
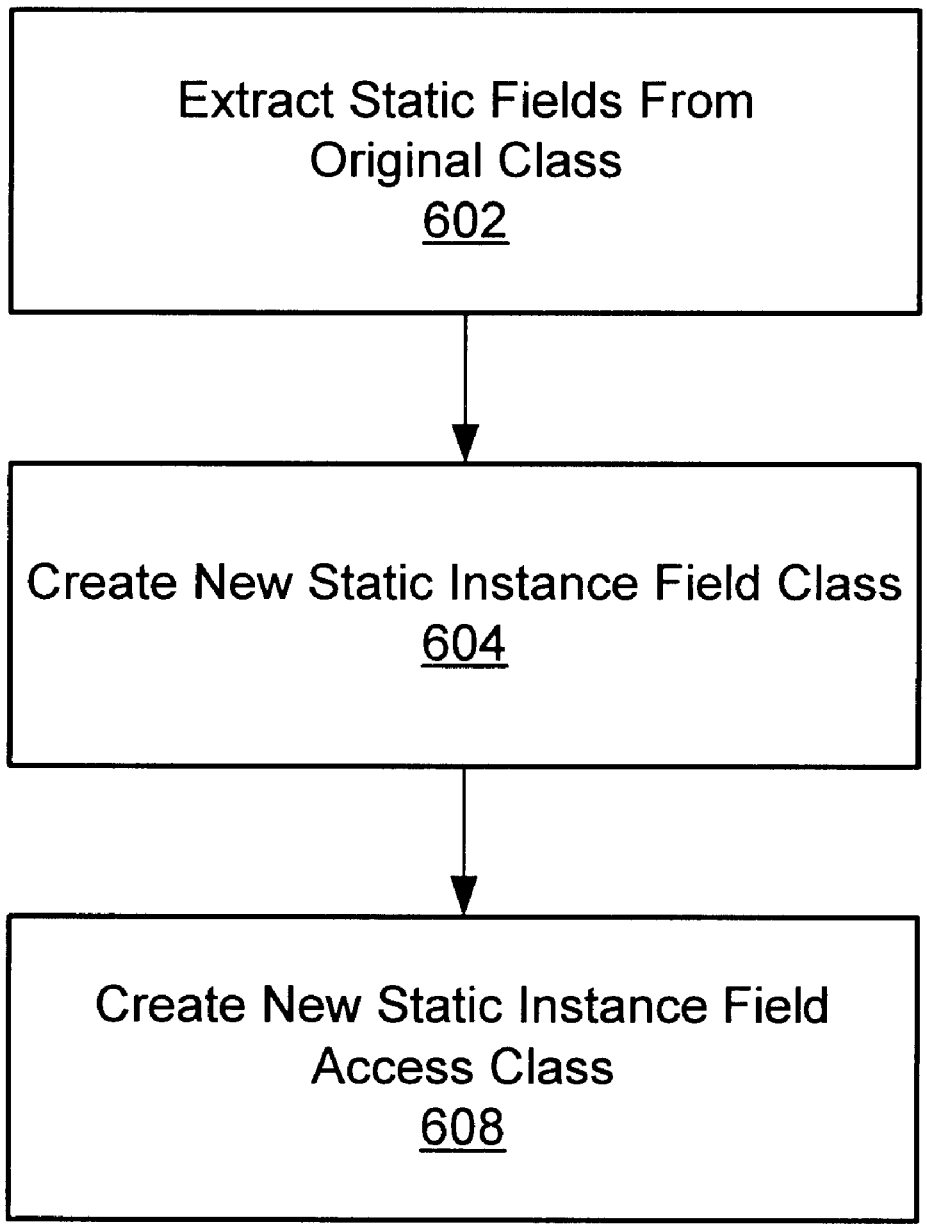
FIG. 6 is an illustration of static field separation according to one embodiment.
Figure 7:
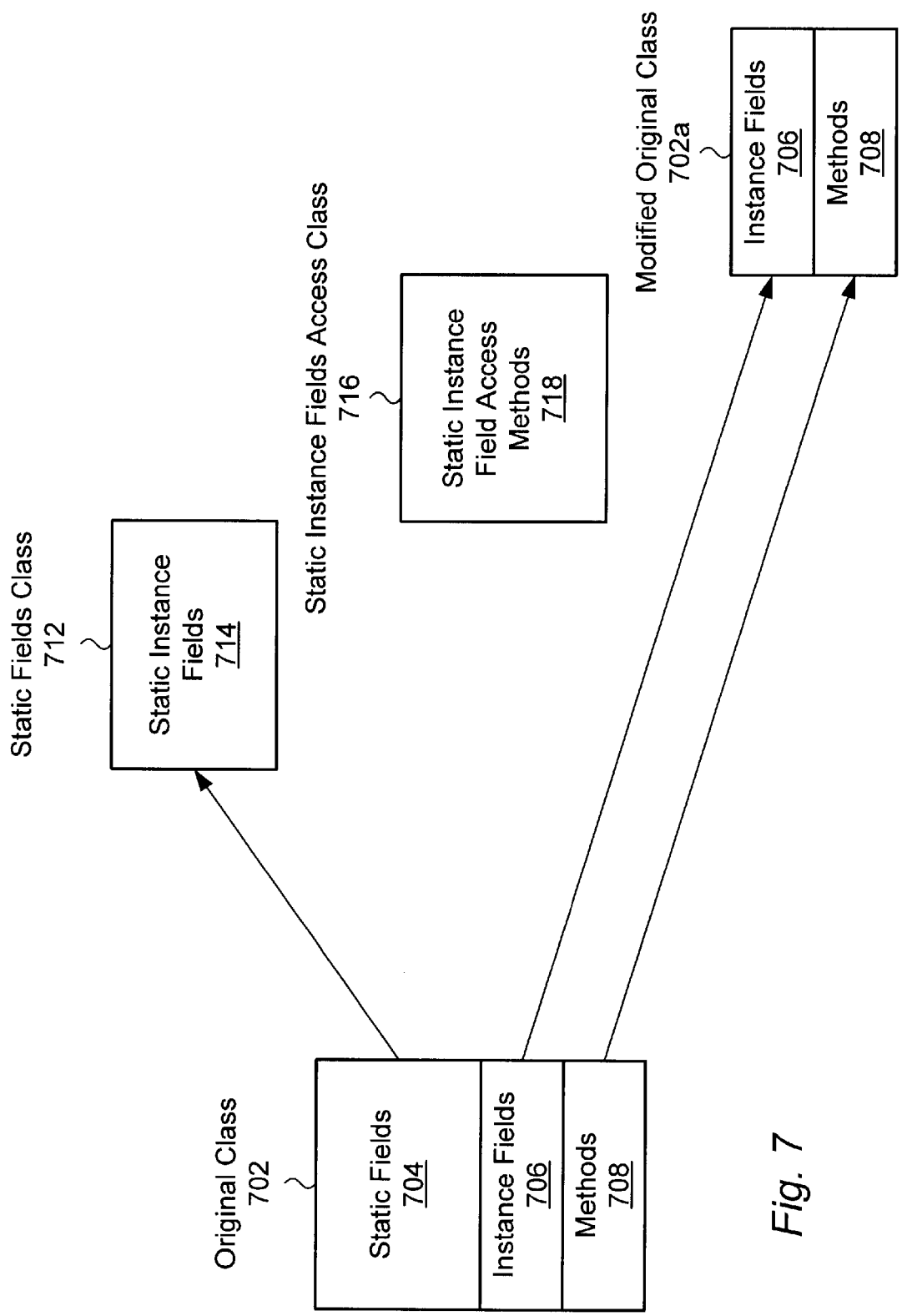
FIG. 7 is a flowchart of static field separation according to one embodiment.
Figure 8:
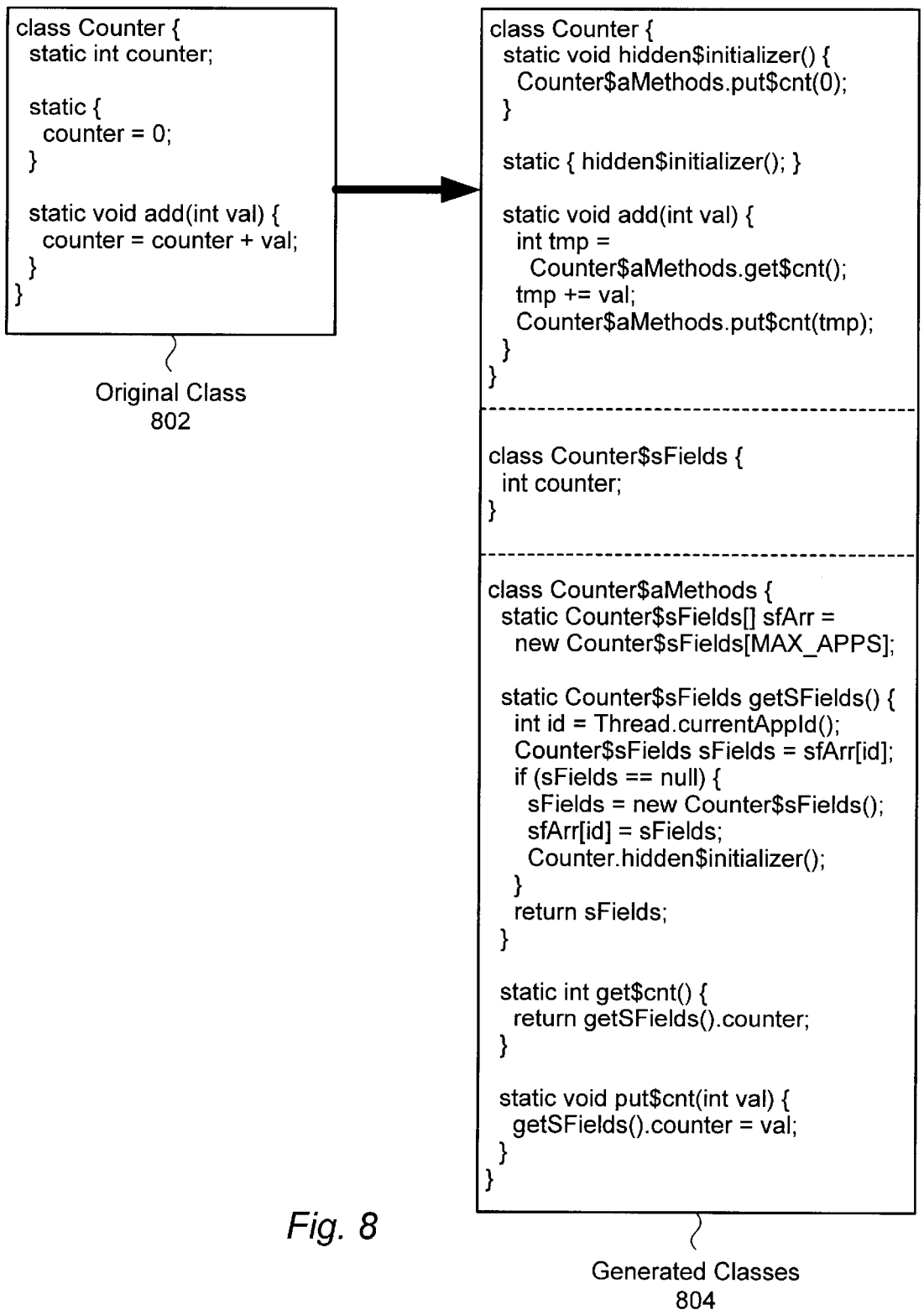
FIG. 8 illustrates an example of static field separation according to one embodiment.

FIGS. 6, 7, and 8: Separating the Static Fields Component of a Class

FIGS. 6, 7, and 8 illustrate embodiments of the system and method for isolating the execution of applications by separating out the static fields component of a class as discussed with reference to FIG. 5. For purposes of illustration, the process of separating out the static fields component of a class is described as follows in the context of a hypothetical source-to-source transformation implementation. In another embodiment of the invention, the separation process may be performed by the same transformations but at the bytecode level. Bytecode-to-bytecode transformation is typically preferable over Java-to-Java source transformation since often the source is not available. However, the Java-to-Java source transformation is more appropriate for both explaining the process and exposing technical details and implementation issues. In various embodiments, the transformation may be performed at runtime or at compilation.

The applications may include applets, servlets, operating system services, components, JavaBeans™, or other suitable executable units or programs. "Application" and "program" are herein used synonymously. In one embodiment, the applications are executable in a platform-independent programming environment such as the Java™ environment as discussed with reference to FIG. 2. In one embodiment, the applications are executable on a single instance of a virtual machine, such as a Java™ Virtual Machine, which is implemented in accordance with a platform-independent virtual machine specification, such as the Java™ Virtual Machine Specification.

FIG. 6 illustrates the process of separating out the static fields component of a class according to one embodiment. In various embodiments, the steps shown in FIG. 6 may be performed in a different order than the order shown. The plurality of applications may utilize one or more "original" classes. In other words, the original classes may be shared by a plurality of applications. In one embodiment of the system and method for isolating applications, only one copy of each original class is maintained, regardless of how many applications utilize it. Classes may be transparently and automatically modified as shown in steps 602 through 606. In step 602, one or more static fields are extracted from one or more original classes utilized by any of the plurality of applications, wherein each of the one or more original classes includes at least one static field.

In step 604, a separate copy of the one or more static fields is created for each of the plurality of applications, wherein each of the separate copies corresponds to one of the plurality of applications. Creating the separate copy of the one or more static fields may include creating a static field class which includes instance fields corresponding to the one or more static fields, wherein each instance of the static field class corresponds to one of the plurality of applications. In these new classes, the type modifier of the fields is converted from static to simple instance fields. These fields may hereinafter be referred to as static instance fields.

In step 606, one or more access methods for the static fields may be created. As used herein, an "access method" is a method that provides access to storage locations such as static fields. The access methods are operable to access the corresponding separate copy of the one or more static fields based upon the identity of the utilizing or calling application. Creating access methods for each of the one or more static fields may include creating a single access methods class for each original class which includes the access methods for accessing the extracted fields from the original class. The new class which contains the access methods for the new static instance fields may hereinafter be referred to as the static instance field access class or access methods class.

In one embodiment, as described above and illustrated by FIG. 7, any original class 702 containing static fields 704 is transparently and automatically split into three classes: the original class including instance fields 706 and methods 708 but without the static fields 704, referred to as the modified original class 702a; a new class containing all the static fields which are now instance fields 714, referred to as the static instance field class or static field class 712; and a new class containing methods 718 to access these fields, the static instance field access class or access methods class 716. The access methods class 716 maintains a copy (i.e., instance) of each static field class 712 per application domain and is operable to access the proper copy (i.e., instance) of this class based on the application identity extracted from the current thread. In one embodiment, only one copy of the modified original class 702a and access methods class 716 is present in the virtual machine regardless of the number of applications using the original class. In this manner, the amount of class replication is minimized, and the overall memory footprint is minimized as a result. Also, any fields prone to inter-application interference are replicated and isolated to assure a secure processing environment for each application. The system and method shown in FIGS. 6 and 7 may also allow class loaders to be removed from the type system.

In another embodiment, the method for separating static fields from original classes may be performed upon structures rather than classes, such as in a programming environment that is not object-oriented.

FIG. 8 illustrates an example of source code of a class 802 with a static field before the separation transformations, and the three resulting classes 804 after the transformation, according to one embodiment of the system and method. In this example, the original class 802 is a simple counter class. It includes a single static member variable, called counter; a static initializer; and a static method, add, which is used to modify the value of counter.

In one embodiment, the transformations affect only static fields and the way they are accessed. The original class, Counter, undergoes the following modifications. In one embodiment, all static fields are removed from Counter. A new method, hidden$initializer( ), is added. It contains a modified version of the code of the static initializer of Counter. It is invoked whenever a new domain uses the static fields of Counter for the first time. The code for hidden$initializer( ) is presented in resulting classes 804.

The second new class, Counter$sFields, contains all the static fields of Counter. In one embodiment, all modifiers (static, final, private, etc) are removed from the fields so that they have package access. Thus, all static fields of Counter become instance, non-final, package-access fields of the new class Counter$sFields, as shown in resulting classes 804.

The third and final generated class is Counter$aMethods. It contains a table mapping domain identifiers onto per-domain copies of Counter$sFields. For each field from Counter$sFields there is a pair of get$( ) and put$( ) methods in Counter$aMethods. In this example, there is only one static field, and thus Counter$aMethods has only two such access methods: put$cnt( ) and get$cnt( ). Each of them looks up the copy of Counter$sFields corresponding to the current domain and then accesses the named field. If the lookup does not succeed, it means that this domain's copy of Counter$sFields has not been generated yet and that the appropriate initialization must be made. In an alternate embodiment, the field(s) in Counter$sFields and the methods of Counter$aMethods could be stored in the original class file of Counter. In embodiments using the Java™ Language, it should be noted that this is possible for proper classes only; interfaces typically cannot have non-abstract methods.

Once these modifications are performed, the code of each method is inspected as follows. In one embodiment, each access to a static field is automatically replaced with the appropriate get$( ) or put$( ) method. At the bytecode-to-bytecode transformation level, this becomes a replacement of each getstatic or putstatic instruction with get$( ) or put$( ), respectively.

In one embodiment, the automatic transformations described above may be augmented with manual re-coding of several atypical classes. For example, in some implementations of the JVM, the System out field is initialized by the runtime. It is important to ensure that each application has an access to System.out (if a security policy of a given environment allows this) and, at the same time, that this static field is not directly shared by the applications. System properties are another example. Policy decisions may be made concerning whether applications can write to a shared copy of system properties, or whether each application should see a separate, read-only copy, or whether some other solution is appropriate. In general, resources that are shared by all classes should be identified for each particular JVM. However, such manifestations of a single-processing original nature of Java™ are very rare. Therefore, manually dealing with these manifestations may be appropriate for only a handful of system classes. Simply wrapping objects and marking the wrapped classes as non-transformable may be the most effective solution.

According to the system and method discussed with reference to FIGS. 6 through 8, classes can be modified one-by-one. In other words, there generally is no need to analyze another class before ending the modifications to the current class ("peephole code modification"). Another desirable property of the system and method is that the changes may involve source-to-source post-compilation transformation and as such are portable.

Optimizations

In various embodiments, there are a number of optimizations for the system and method which may be performed as source-to-source transformations. As such, they do not break portability, but some may require analyzing more than one class before optimized modifications to a particular class can be completed.

One category of optimizations is preserving selected final static fields in their original classes. In such cases, original getstatic (and, in initialization code, putstatic) instructions are left unmodified whenever accessing such preserved fields. This avoids the need to look up the current application identifier and then to find the corresponding $sFields object.

The most straightforward optimization is to preserve final static fields of primitive types in their original classes since this does not lead to any inter-application interference. When applying this optimization, it may be appropriate to scan the bytecode of referenced classes in order to determine whether or not a field named in getstatic or putstatic is final.

Another optimization may be to preserve static final strings in their original classes. Strings are immutable, so their fields or methods cannot act as a data communication channel between applications. However, if an application uses a static final string as a monitor object for a synchronized statement, another instance of this application may compete for the same lock. Thus, preserving static final strings may sometimes lead to unwanted interference at the level of accessing mutual exclusion code.

In general, it is recommended that objects be preserved in their original classes only if they are not used as synchronization objects and if they are immutable. A special category of such objects is arrays of primitive types. A simple, conservative analysis often suffices to determine that a given static final array is in fact immutable. Preserving such immutable arrays in their original classes may lead to significant performance gains in some special cases.

In one embodiment, therefore, a set of static fields may be classified as secure for utilization by the plurality of applications without inter-application interference. The secure set of static fields may include final static fields of primitive types, final static strings, immutable arrays of primitive types, and/or other appropriate fields. The secure set of static fields may then be preserved within the one or more classes. In other words, the set of static fields may be exempted from the one or more static fields which are extracted from the one or more classes.

Some further optimizations may also be performed. For example, for actual classes (i.e., not interfaces), all the new get$( ) and put$( ) methods may actually be added to the class itself. This technique effectively merges the $aMethods classes into their original classes, although the performance gains from this method are uncertain.

The approach described above minimizes the amount of resources needed for running multiple applications in the same copy of a virtual machine such as the JVM. Only one copy of each class exists in the system. This leads to fast startup of applications whose instances are already running and minimizes the space needed for code, especially for the JITed code. As has been discussed above, applications can be protected from one another both at the level of data access and at the level of access to static synchronized methods.

In one embodiment of the invention using a Java™ Virtual Machine, the isolation system and method described above may be added to the JVM runtime. The rationale behind implementing them in a custom runtime is (1) to minimize the overheads, (2) to simplify the implementation, and (3) to remove bytecode editing from the critical "fetch class file-load-execute" path when bytecode editing cannot be done off-line. In one embodiment, an efficient way to modify the runtime may be to provide the perapplication copies of static fields along with the loaded class image. This tends to ensure that no bytecode has to be modified. In particular, no new classes are generated and no field access modifiers are changed, which addresses security concerns. Past experience with moving from a bytecode-editing prototype to a custom runtime (in order to account for computational resources) indicates that in the case of application isolation, the overheads can be reduced by an order of magnitude. See Czajkowski, G., and von Eicken, T., JRes: A Resource Control Interface for Java, In Proceedings of ACM OOPSLA'98, Vancouver, BC, Canada, October 1998. The price is the loss of portability of the multiprocessing layer, inherent in customizing the runtime.

Figure 9:
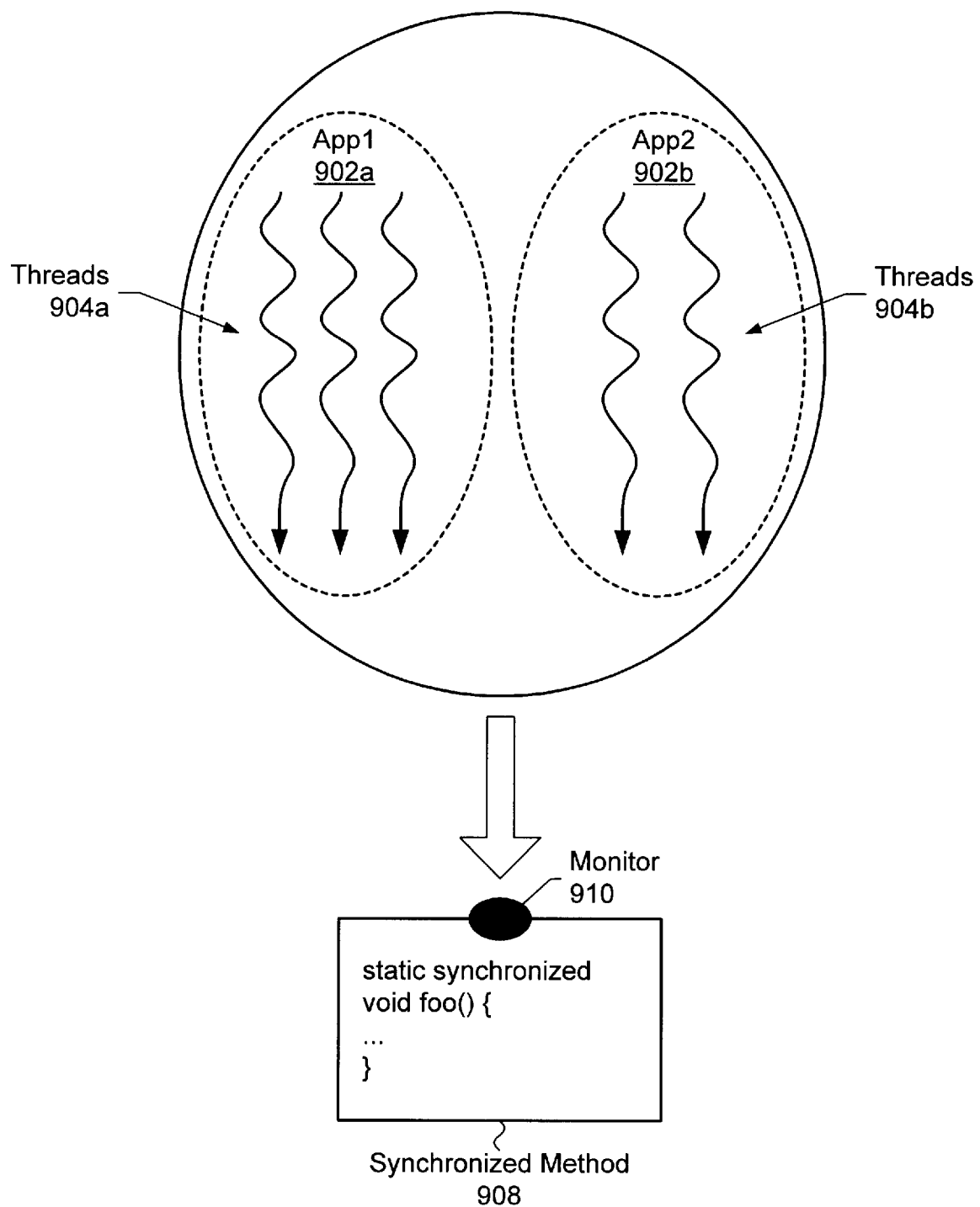
FIG. 9 illustrates the contention of multiple applications for a synchronized static method in a multi-threaded, multi-application process space.

FIG. 9: Threads And Static Synchronized Methods

FIG. 9 illustrates the contention of multiple applications for a synchronized static method in a multi-threaded, multi-application process space. Application 902a with execution threads 904a relies on monitor 910 for access to the static synchronized method 908. Similarly, application 902b executing threads 904b accesses the synchronized static method 908 via the monitor 910. As used herein, the terms "lock" and "monitor" are used interchangeably. Because the method 908 is static, it is shared between the two applications 902; and because it is declared synchronized, only one application may access it at a given time. Assuming, for example, that application 902a has received the lock 910 on the method 908, the other application 902b must wait until the first application 902a has released the lock 910 to gain access. If for some reason, application 902a suspends the controlling thread, such that the lock 910 is not released, then application 902b will be denied access to the method 908.

Figure 10:
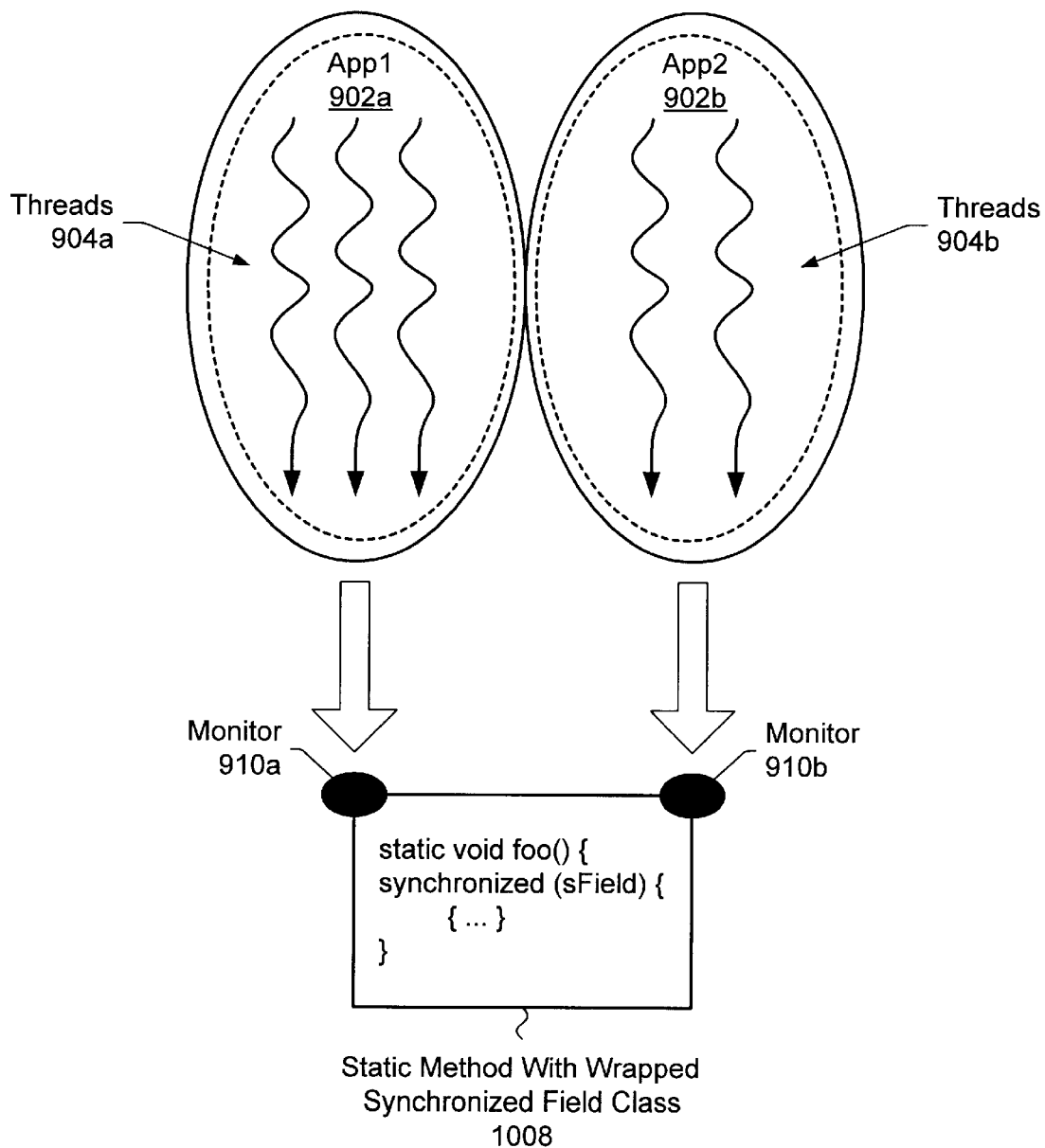
FIGS. 10 and 11 illustrate the system and method of isolating static synchronized methods in a multi-threaded, multi-application environment according to one embodiment.
Figure 11:
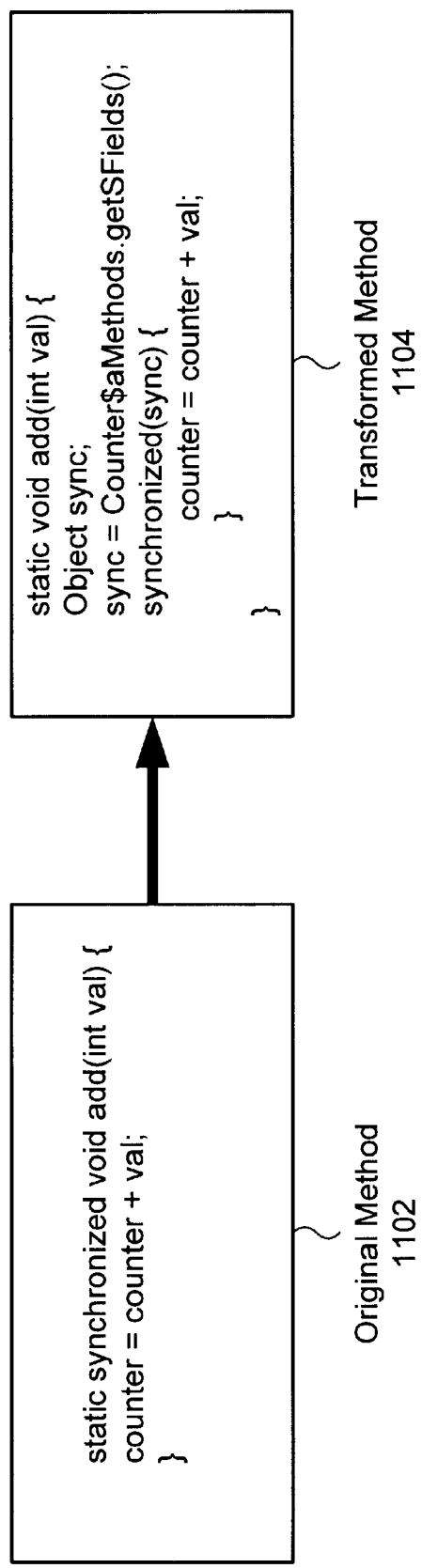

FIGS. 10 and 11: Isolation of Static Synchronized Methods

FIGS. 10 and 11 illustrate the system and method of isolating static synchronized methods in a multi-threaded, multi-application environment. The problems of inter-application interference due to contention for a static synchronized method may in large part be addressed by isolating the execution of a plurality of applications by providing multiple monitors for the static synchronized method. As noted above, the applications may include applets, servlets, operating system services, components, JavaBeans™, or other suitable executable units or programs.

FIG. 10 illustrates the general approach of providing a plurality of monitors for a plurality of applications to access a synchronized method according to one embodiment. The applications 902a and 902b are enabled or permitted to call the synchronized method 1008 concurrently by accessing the synchronized method 1008 through the plurality of monitors 910a and 910b, respectively. In one embodiment, therefore, one application cannot typically prevent another application from using a given synchronized method. A plurality of threads 904 within one of the applications are excluded or prevented from calling the synchronized method concurrently.

In one embodiment, the synchronized method 1008 is a static synchronized method such as in the Java™ Language. In one embodiment, each monitor 910 corresponds to one of the plurality of applications 902 which calls the synchronized method 1008; i.e., there is a one-to-one correspondence between applications 902 and monitors 910. In various embodiments, the source code or the bytecode for the synchronized method 1008 may be transformed by removing a method-level monitor, which would be shared among applications, and adding the plurality of monitors inside the method by using a monitor for each instance of the static field class, which would be specific to each application.

In one embodiment, the method for isolating the execution of the applications may be transparent to the utilizing applications. It should also be noted that in various embodiments, the extraction of the static fields, creation of the separate copies of the static fields, creation of the access methods, and replacement the static synchronized methods may be performed at run-time or at compilation, and at the source level or the bytecode level. Also, it should be noted that in a further embodiment, the method may not be limited to formal classes, but may also be applied to structures, such as in a programming environment that is not object-oriented.

Referring back to FIG. 8 above, suppose that the add( ) function of Counter is a synchronized method. This may lead to the following problem in the transformed code: one application calls add( ) and while the calling thread executes the body of the method, it is suspended by another thread from the same application. This may result in a serious denial-of-service problem since the suspended thread still holds a lock and no other application is able to execute Counter.add( ). This problem does not exist if multiple applications using the class Counter are loaded by separate class loaders. However, if class loaders are eliminated through the application of the system and method for application isolation shown in FIGS. 6 through 8, the problem remains.

As shown in the example of FIG. 11, a relatively simple transformation to the method code may address these problems. This transformation may be performed in conjunction with the transformation described above with reference to FIGS. 6 through 8. As described above, the original class may be shared by a plurality of applications, and include at least one static synchronized method. Typically, each static synchronized method includes an executable block of code which comprises the body of the method.

As shown in FIG. 11, the original static synchronized method 1102 modifies the static class variable counter. In the transformation of the static method (and optionally the static field separation described with reference to FIGS. 6 through 8), the synchronization for static methods is replaced by synchronization on the $sFields object owned by the current (i.e., utilizing or invoking) application. Specifically, in the example code of the transformed method 1104, it may be seen that the method itself is no longer synchronized. Instead, the instance of the static field class corresponding to the calling application is retrieved and synchronized over the scope of the method body. Hence, the "static" instance variables of the class (which are accessible only by the current application) are modified in a way that restricts lock contention to concurrently executing threads in the current application. In order to permit the generic solution as shown in FIGS. 10 and 11, it is recommended that $sFields objects be generated even for original classes which lack static fields.

Various embodiments may further include receiving or storing instructions and/or data implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as network 108 and/or a wireless link.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A method for isolating the execution of a plurality of applications, the method comprising:
   extracting one or more static fields from an original class utilized by any of the plurality of applications, wherein the original class comprises at least one static field;
   creating a separate copy of the one or more static fields for each of the plurality of applications, wherein each of the separate copies corresponds to one of the plurality of applications; and
   creating one or more access methods for the one or more static fields, wherein the access methods are operable to access the corresponding separate copy of the one or more static fields based upon the identity of the utilizing application.

2. The method of claim 1, wherein creating the separate copy of the one or more static fields comprises creating a static field class which comprises instance fields corresponding to the one or more static fields, wherein each instance of the static field class corresponds to one of the plurality of applications.

3. The method of claim 1, wherein creating the one or more access methods for the one or more static fields comprises creating an access methods class corresponding to the original class which comprises the one or more access methods for accessing the extracted fields from the original class.

4. The method of claim 1, wherein extracting the one or more static fields, creating the separate copies of the one or more static fields, and creating the access methods for the one or more static fields are performed within a virtual machine.

5. The method of claim 4, wherein the virtual machine is implemented in accordance with a platform-independent virtual machine specification.

6. The method of claim 1, wherein the plurality of applications are executable in a platform-independent programming environment.

7. The method of claim 1, wherein extracting the one or more static fields, creating the separate copies of the one or more static fields, and creating the access methods for the one or more static fields is transparent to the utilizing applications.

8. The method of claim 1, wherein extracting the one or more static fields, creating the separate copies of the one or more static fields, and creating the access methods for the one or more static fields are performed at run-time.

9. The method of claim 1, wherein extracting the one or more static fields, creating the separate copies of the one or more static fields, and creating the access methods for the one or more static fields are performed at compilation.

10. The method of claim 1, wherein extracting the one or more static fields, creating the separate copies of the one or more static fields, and creating the access methods for the one or more static fields further comprise transforming the bytecode of the one or more applications.

11. The method of claim 1, wherein extracting the one or more static fields, creating the separate copies of the one or more static fields, and creating the access methods for the one or more static fields further comprise transforming the source code of the one or more applications.

12. The method of claim 1, further comprising:
   classifying a set of static fields comprised within the original class as secure for utilization by the plurality of applications without inter-application interference;
   preserving the secure set of static fields within the original class.

13. The method of claim 12, wherein the secure set of static fields comprises final static fields of primitive types.

14. The method of claim 12, wherein the secure set of static fields comprises final static strings.

15. The method of claim 12, wherein the secure set of static fields comprises immutable arrays of primitive types.

16. The method of claim 12, wherein preserving the secure set of static fields within the original class comprises exempting the secure set of static fields from the one or more static fields which are extracted from the original class.

17. A method for isolating the execution of a plurality of applications, the method comprising:
   extracting one or more static fields from an original structure utilized by any of the plurality of applications, wherein the original structure comprises at least one static field;
   creating a separate copy of the one or more static fields for each of the plurality of applications, wherein each of the separate copies corresponds to one of the plurality of applications; and
   creating one or more access methods for the one or more static fields, wherein the access methods are operable to access the corresponding separate copy of the one or more static fields based upon the identity of the utilizing application.

18. The method of claim 17, wherein creating the separate copy of the one or more static fields comprises creating a static field class which comprises instance fields corresponding to the one or more static fields, wherein each instance of the static field class corresponds to one of the plurality of applications.

19. The method of claim 17, wherein extracting the one or more static fields, creating the separate copies of the one or more static fields, and creating the one or more access methods for the one or more static fields are performed within a virtual machine.

20. The method of claim 17, wherein the plurality of applications are executable in a platform-independent programming environment.

21. A system for isolating the execution of a plurality of applications, the system comprising:

an original class utilized by the plurality of applications, wherein the original class comprises one or more static fields;

a modified original class generated from the original class, wherein the modified class comprises the original class without the static fields;

a static field class generated from the original class, wherein each instance of the static field class corresponds to one of the plurality of applications, and wherein the static field class comprises one or more instance fields corresponding to the one or more static fields of the original class; and an access methods class generated from the original class, wherein the access methods class comprises one or more access methods for accessing the instance fields of the static field class.

22. The system of claim 21, further comprising:

a virtual machine which is operable to execute the plurality of applications.

23. The system of claim 21, wherein the plurality of applications are executable in a platform-independent programming environment.

24. A carrier medium comprising program instructions which are computer-executable to implement:

extracting one or more static fields from an original class utilized by any of a plurality of applications, wherein the original class comprises at least one static field;

creating a separate copy of the one or more static fields for each of the plurality of applications, wherein each of the separate copies corresponds to one of the plurality of applications; and creating one or more access methods for the one or more static fields, wherein the access methods are operable to access the corresponding separate copy of the one or more static fields based upon the identity of the utilizing application.

25. The carrier medium of claim 24, wherein in creating the separate copy of the one or more static fields, the program instructions are further computer-executable to implement creating a static field class which comprises instance fields corresponding to the one or more static fields, wherein each instance of the static field class corresponds to one of the plurality of applications.

26. The carrier medium of claim 24, wherein in creating the one or more access methods for the one or more static fields, the program instructions are further computer-executable to implement creating an access methods class corresponding to the original class which comprises the one or more access methods for accessing the extracted fields from the original class.

27. The carrier medium of claim 24, wherein the program instructions and the plurality of applications are executable by a virtual machine in a platform-independent programming environment.

28. The carrier medium of claim 24, wherein the program instructions are further computer-executable to implement:

classifying a set of static fields comprised within the original class as secure for utilization by the plurality of applications without inter-application interference;

preserving the secure set of static fields within the original class.

29. The carrier medium of claim 24, wherein the carrier medium is a memory medium.

30. The carrier medium of claim 24, wherein the carrier medium is a transmission medium.

* * * * *